(12) United States Patent
Clough et al.

(10) Patent No.: US 7,530,161 B2
(45) Date of Patent: May 12, 2009

(54) QUICK-FORM METAL TOOLING SYSTEM FOR GENERATORS STATOR BARS

(75) Inventors: Mark Clough, Strasburg, OH (US);
James T. Henley, Saratoga Springs, NY (US); Jeffrey A. Henkel, New Philadelphia, OH (US)

(73) Assignee: General Electric Company, Schenectady, NY (US)

( * ) Notice: Subject to any disclaimer, the term of this patent is extended or adjusted under 35 U.S.C. 154(b) by 225 days.

(21) Appl. No.: 11/581,010

(22) Filed: Oct. 16, 2006

(65) Prior Publication Data

US 2008/0086872 A1 Apr. 17, 2008

(51) Int. Cl.
*B23P 19/00* (2006.01)

(52) U.S. Cl. ............................. 29/732; 29/596; 29/606; 29/736; 242/433.2

(58) Field of Classification Search ........... 29/729–736, 29/506–598, 605–608, 564.1; 140/92.1, 140/92.2; 310/58–61, 254, 270; 242/433.3–433.4
See application file for complete search history.

(56) References Cited

U.S. PATENT DOCUMENTS

| | | | | |
|---|---|---|---|---|
| 4,918,835 A * | 4/1990 | Raschbichler et al. | .......... | 29/732 |
| 5,947,404 A * | 9/1999 | Dolgas et al. | ............ | 242/433.3 |
| 6,061,899 A * | 5/2000 | Cardini et al. | ................. | 29/736 |
| 7,275,300 B2 * | 10/2007 | Clough et al. | ................. | 29/596 |
| 2008/0086872 A1* | 4/2008 | Clough et al. | ................. | 29/732 |

* cited by examiner

*Primary Examiner*—Minh Trinh
(74) *Attorney, Agent, or Firm*—Nixon & Vanderhye P.C.

(57) ABSTRACT

A modular "quick-form" tooling system and stator bar form set-up method is provided for reconfigurably mounting various stator bar bending/forming tool modules that are used to produce custom bends and curvatures in a length of stator bar stock. At least one stator bar support structure is provided having a support surface formed with an array of tool location alignment holes that allow a variety of different bend-forming tooling modules to be positioned relative to each other in a manner that will define the shape of a generator stator bar during a bending/forming process.

6 Claims, 2 Drawing Sheets

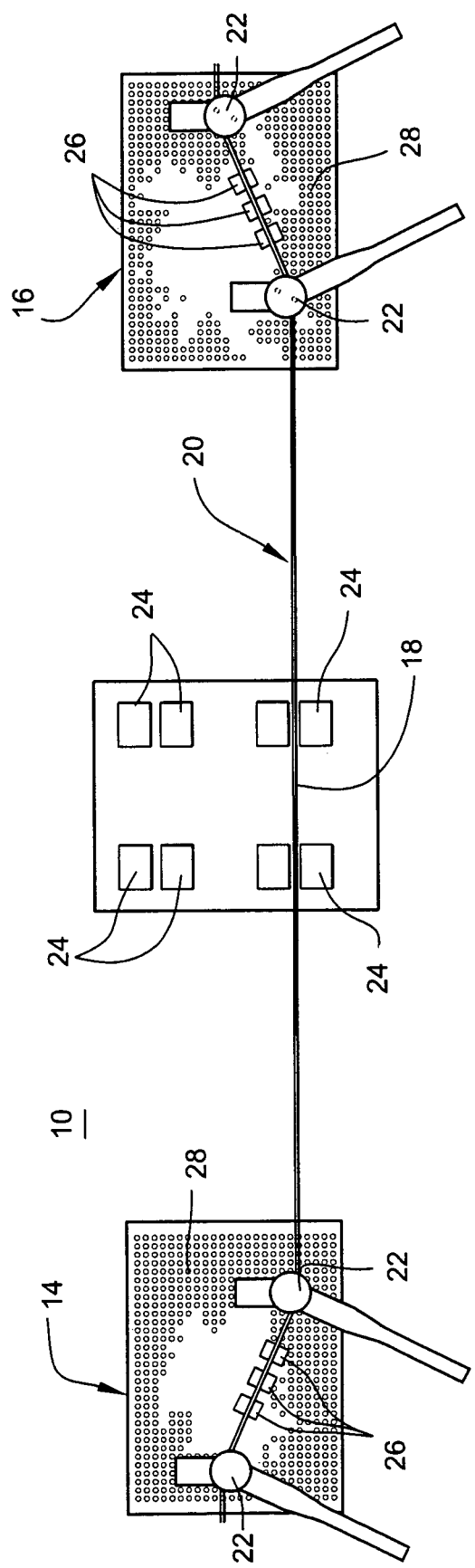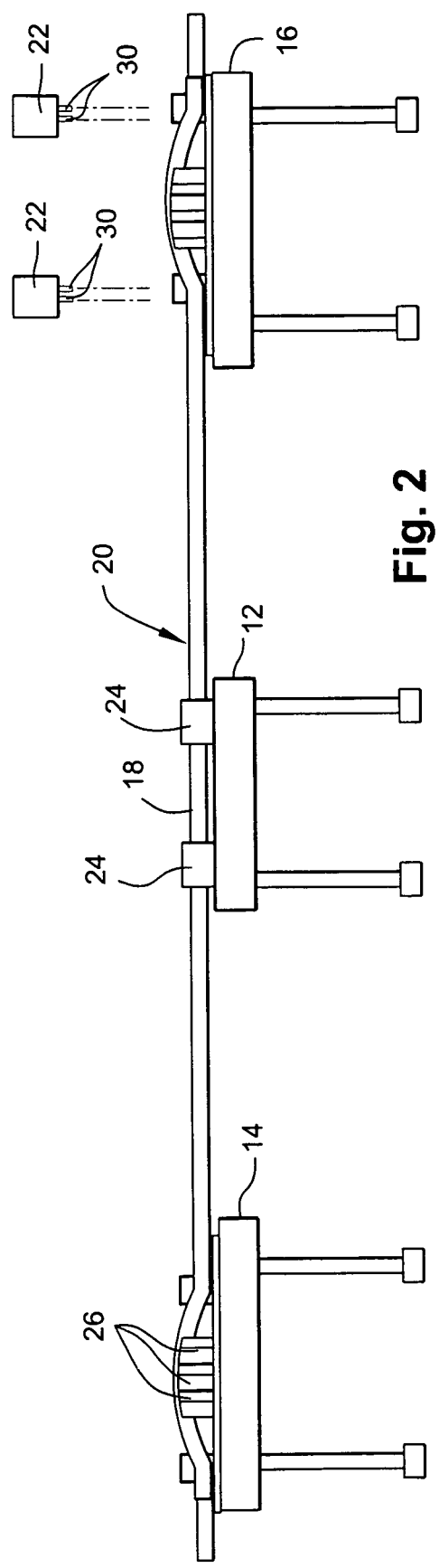

QUICK-FORM METAL TOOLING SYSTEM FOR GENERATORS STATOR BARS

FIELD OF THE INVENTION

This invention relates generally to metal tooling equipment and, more specifically, to metal tooling forms and bend-forming tools used to shape generator stator bars.

BACKGROUND OF THE INVENTION

Currently, the manufacture of custom stator bars used in large electrical power generators is costly and time-consuming. This is particularly true in field repair situations where a needed stator bar configuration is not of standard design, or at least is not of a design that is familiar to the repairing entity. In such instances, new replacement stator bars are manufactured using custom fabricated stator bar bending forms based upon existing stator bar design drawings, if available, or from actual stator bars removed from a generator and shipped to the manufacturing/repair facility. The fabrication and setting-up of bending forms is a time-consuming and costly undertaking, especially when forms are fabricated for custom or non-standard stator bar designs that may result in only a single use or have limited applications. Accordingly, there is a need for a versatile stator bar tooling form and system for shaping/forming stator bars that is quick to set up, easily re-configurable, universally applicable to accommodate a wide variety of different bending/forming design configurations and, in particular, readily adaptable for accommodating custom field applications.

BRIEF DESCRIPTION OF THE INVENTION

An example non-limiting implementation of a metal tooling form set-up method and modular tooling "quick-form" system and apparatus for shaping large electrical power generator stator bars is disclosed. The example implementation described herein includes a stator bar center section support structure/clamping station and a pair of stator bar end-arm support structures positioned at opposite sides of the center-section support structure. The stator bar end-arm support structures each have a support surface formed with an array of tool location alignment holes enabling a variety of diverse tooling modules, such as bend-forming, mid-curvature forming and adjustable clamping tools, to be precisely positioned relative to each other and to the center clamping station structure so as to produce desired bends in a piece of stator bar stock.

In the non-limiting example implementation shown herein, the stator bar end-arm support structures each mount a pair of bend-forming tooling modules separated by a plurality of mid-curvature height-wise forming modules or "forming piers". The bend-forming and mid-curvature forming tool modules are each provided with a stator bar contacting portion or "forming block" portion for guiding and shaping a particular section of the stator bar during the bending process. This stator bar contacting portion of the tooling modules is removable and replaceable and is custom designed for each module to have a specific shape that will impart the appropriate curvature to a predetermined portion of the stator bar stock during the forming operation. In addition, each tooling module is outfitted with one or more tool location alignment pins on an underside mounting surface which mate with predetermined alignment holes provided on the upper surface of the support structures. The pair of end-arm support structures are fixedly attached to floor but may be adjustable in position relative to the center support structure and may also include various pre-bend and post-bend clamping tools for securing the stator bar stock during bending/forming operations.

The tool modules are each designed, manufactured and assigned a position on an appropriate support structures in accordance with information specifying the dimensions of the desired stator bar through the use of relational 3-D modeling software. For example, the dimensions of a replacement stator bar are provided as inputs to a conventional 3-D modeling software program that designs and controls the manufacture of the metal working and bend-forming surfaces of various types of bending/tooling modules that will be needed to conform a piece of stator bar stock to the required shape. Each tooling module is provided with a mounting surface with one or more protruding tool location alignment pins that fit into specific corresponding tool alignment/locating holes on the support structures. Assignments of particular tool location alignment holes for mounting and positioning specific tooling components on the support surfaces of the end-arm and center-section support structures are determined by the relational 3-D modeling program. The various tooling modules/bend-forming piers may be of a manually operated type or may include various electric and hydraulic parts for automated or assisted operation. After specified tooling modules are manufactured and delivered to a generator manufacturing/repair work site, a stator bar form may be quickly and easily set up using specific tooling modules placed at predetermined positions on the work surfaces of the quick-form tooling system support structures as directed by the relational 3-D modeling software. The shaping of the stator bar stock may then proceed in a conventional manner.

The provision of a modular stator bar bending form system and apparatus that comprises one or more support structures each having a surface replete with an array of tool position mounting holes that accept a variety of modular clamping, curvature-imparting and bend-forming tools, each arranged to define a portion of a stator bar's shape during the forming process, makes the process of setting-up differently configured bending forms for custom bar shaping applications both quick and easy. In addition, the exemplary quick-form tooling system and method implementation disclosed herein allows a desired stator bar bending form configuration to be rapidly and inexpensively duplicated at multiple and remote manufacturing/repair facilities.

As will be seen from the following description, the non-limiting example implementation of a stator bar quick-form tooling system and method presented herein provides numerous advantages over conventional prior art stator bar forming methods and apparatus. Such advantages include, for example, a modular tooling system and process that may be easily implemented and replicated by multiple generator manufacturing/repair centers, the ability to minimize tooling configuration set-up times for changes in production runs, and the versatility of using discrete modular tooling form set-ups and inserts which allow stator bar manufacturers to quickly configure and set-up a specific tooling form arrangement and begin first-piece qualification within a few hours time. For example, in most situations the design and manufacture of new tooling can be accomplished in as little as a few days, with tooling form set-up and first-piece forming taking only about eight hours. Another beneficial aspect of the disclosed example quick-form tooling system and method implementation is that it greatly reduces the amount of time and expense required to design and create new stator bar forms and also reduces the amount of variation in results produced from different generator manufacturing/repair centers when making the same stator bar.

Accordingly, in one aspect of the exemplary non-limiting implementation disclosed herein, a stator bar quick-form tooling system is provided having at least a stator bar center-section support structure and one or more stator bar end-arm support structures that include a tool module mounting surface having a grid-like array of tool-locating holes wherein one or more stator bar tooling modules may be positioned in a manner that defines a particular stator bar shape during the forming process.

In another aspect of the exemplary non-limiting implementation disclosed herein, a stator bar quick-form tooling system includes a plurality of stator bar tooling modules that are each provided with a removable/replaceable stator bar contacting curvature "forming block" portion for guiding and shaping a particular section of the stator bar during the bending process.

In yet another aspect of the exemplary non-limiting implementation disclosed herein, a stator bar contacting/curvature forming portion of a tooling module has a custom designed shape specific to its relative position in the quick-form so that when the module is placed at the assigned position on a support structure surface it will impart an appropriate curvature to a predetermined portion of the stator bar stock during the forming operation to result in a desired stator bar final shape.

In yet another aspect of the exemplary non-limiting implementation disclosed herein, a tooling method for setting-up a stator bar bending form is provided in which a stator bar bend-forming tooling module having tool-locating pins protruding from a bottom mounting surface is mounted at predetermined locations on a tooling support structure having a surface with a grid-like array of tool-locating holes in a manner that will define a predetermined final shape of a stator bar during a bending/forming process.

In yet a further aspect of the exemplary non-limiting implementation disclosed herein, a tooling method for setting-up a stator bar bending form includes providing a tooling module location plan for identifying a position of a bend-forming tooling module on a surface of tool support structure based on data developed by using dimensional data for a particular stator bar and modeling an appropriate stator bar bending form tooling arrangement through the use of conventional 3-D object modeling software.

The invention will now be described in detail in connection with the drawings identified below.

BRIEF DESCRIPTION OF THE DRAWINGS

FIG. 1 is a top view schematic diagram of an example configuration of the quick-form tooling system and apparatus;

FIG. 2 is a side view schematic diagram of an example configuration of the quick-form tooling system and apparatus.

DETAILED DESCRIPTION OF THE INVENTION

Figure 3:
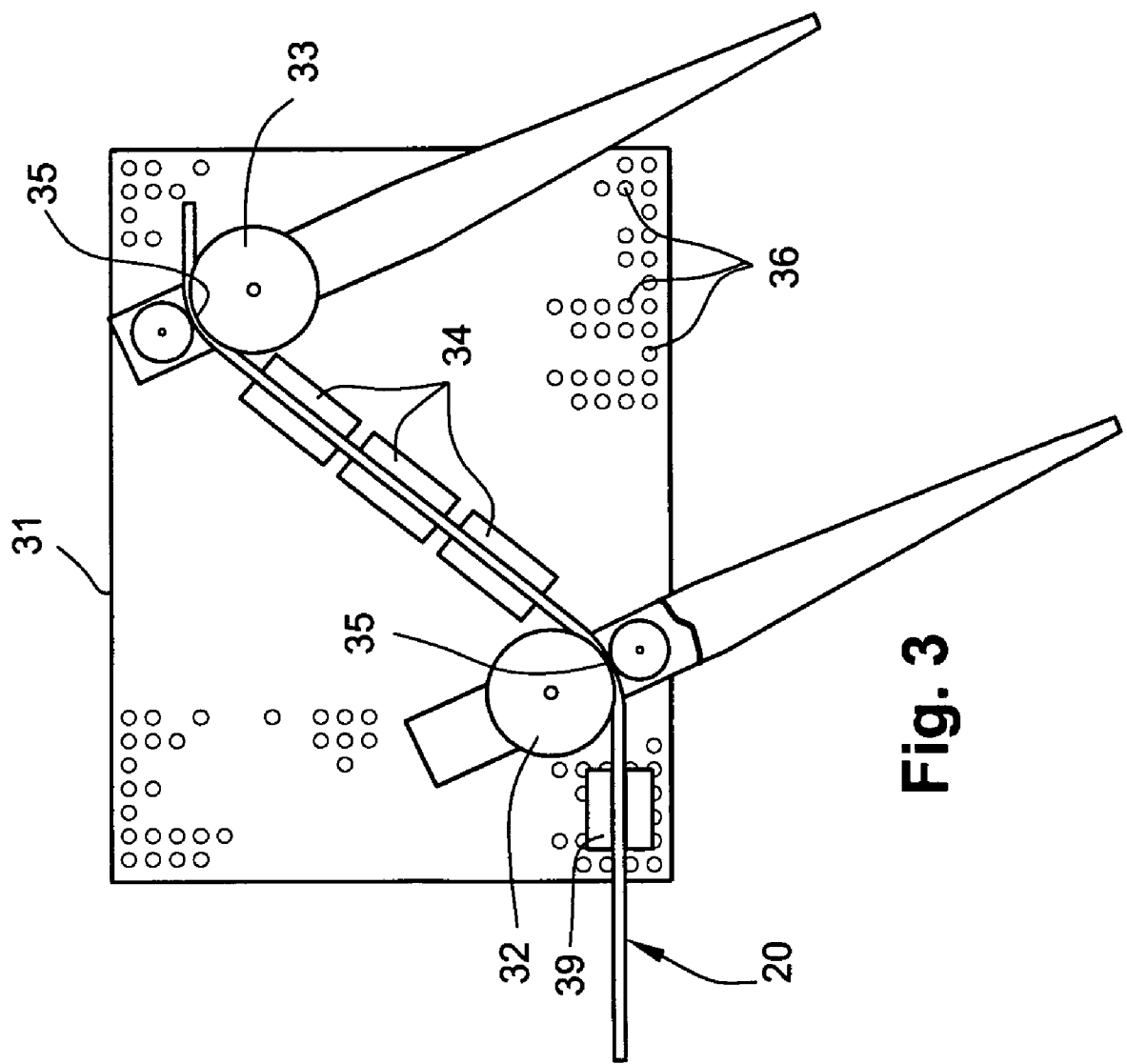
FIG. 3 is a top view detailed schematic diagram of an example stator bar end-arm support structure with tooling for forming bends mounted thereon.

FIGS. 1 and 2 show an example arrangement of a quick-form tooling system 10 with stator bar tooling module bending apparatus in a simplified, schematic form. FIG. 1 provides a schematic top view and FIG. 2 provides a schematic side view. A center stator bar clamping table or support structure 12 may be anchored to the floor in any suitable fashion. On either side of center clamping table 12, one or more stator bar end-arm support structures, 14 and 16 respectively, are also provided.

In the example implementation disclosed herein, each of the support structures is fashioned in the form of a table having a flat top and several support legs and may be initially moveable or repositionable, but during use are anchored to the floor in accordance with conventional practice. It can be appreciated from FIGS. 1 and 2 that the center clamping/support table structure 12 both supports and immobilizes a center section 18 of a piece of conventional stator bar stock 20. Mounted on the top surface of central clamping/support table structure 12 are one or more stator bar clamping mechanisms 24 for positioning and securely supporting and immobilizing a center portion 18 of stator bar stock 20.

In the non-limiting example implementation described herein, the stator bar end-arm support structures 14 and 16 each have a pair of bending tool modules 22 mounted on top surface 28 for shaping the opposite ends of stator bar stock 20. Bending/forming tooling modules 22 may include hydraulic, electric or other manual or automated components to provide assistance to an operator/machinist during the forming operation. In addition, a plurality of mid-curvature height-wise bend forming piers or modules 26 are also provided between each bending tool module 22. The top surface 28 of each end-arm support structure is provided with an array of tool location alignment holes which accept mating mounting pins 30 provided on an underside mounting surface of the bend-forming tool modules 22 and mid-curvature tool modules 26. Since end-arm support structures 14 and 16 are mirror images of one another, therefore only one need be described in detail herein (see discussion herein below of FIG. 3).

The positioning of appropriate tooling modules on the surfaces of one or more appropriately spaced support structures allows producing curvatures in a length of stator bar stock that result in a desired stator bar form and shape. The placement and selection of the particular bend-forming and mid-curvature forming tooling modules to be mounted on each support table structure and the identification of appropriate tool location holes on the surfaces of the support structures for mounting the tooling modules may be determined by using actual physical dimensional measurements taken of a particular generator stator bar or, as explained herein below, by using conventional computer software for providing relational 3-D virtual modeling of both the desired stator bar and the quick-form tooling system 10, including any tooling support structures (e.g., 14,16) with tooling modules 22 mounted thereon.

FIG. 3 shows a more detailed top view of an example stator bar end-arm support table structure 31 having a variety of bend/curvature-forming tool modules 32, 33 and 34 mounted on a top surface that is provided with an array of tool alignment/positioning holes 36. (Note: not all holes are depicted on support structure surfaces in FIGS. 1 and 3.) Tool location positioning holes 36 are arranged in a general grid-like pattern covering a majority of the upper mounting support surface of support structure 31 and may also be provided in a variety of shapes and sizes (e.g., counter-sunk, tapered, etc.) so as to be specifically keyed to particular types of tooling or clamping modules.

Each bend-forming and mid-curvature forming tooling modules (32, 33, 34) includes a contoured curvature-forming stator bar guide portion 35 that is custom designed and manufactured for each particular stator bar forming operation. This custom contoured curvature-forming guide portion of each tooling module is implemented as a removable and replaceable part—with different custom manufactured curvature-forming guides used for tailoring the tooling modules to produce the desired stator bar shape and design. These curvature-forming guide portions 35 of the tooling modules may be made of suitable materials that reduce machining and manufacturing costs.

Each tooling module of the quick-form system is pre-assigned a specific mounting location on an end-arm support structure by relational 3-D modeling software based on data derived from either an existing stator bar design specification/drawing or a software created 3-D model of the desired stator bar. The bend-forming and mid-curvature forming tool modules are each provided with a custom formed stator bar contacting portion or curvature "forming block" portion 35 for guiding and shaping a particular section of the stator bar during the bending process. The stator bar contacting/curvature forming portion 35 of the tooling modules is preferably removable and replaceable and has a custom designed shape specific to each module and its relative position so that when the module is placed at the assigned position on the support table structure surface it will impart the appropriate curvature to a predetermined portion of the stator bar stock during the forming operation. In addition to the bend-forming and mid-curvature height-wise shape forming modules, other types of tooling modules for performing various metal working tasks are also contemplated.

Bend-forming tools 32, 33 and 34 may be any one of a variety of conventional manual and/or hydraulically-assisted metal bending tools fitted with a custom shaped bend-forming-block/bar-guide portion 35 that supports and conforms the stator bar stock 20 to a predetermined shape/curvature during the bending process. The custom shape of the bend-forming-block/bar guiding portion may be produced via conventional numerical controlled machining techniques based on direct measurements of a generator stator bar or, alternatively, based on dimensional data derived via computer modeling of the desired stator bar shape using relational 3-D virtual modeling software.

In the example implementation, end-arm support structure 31 also includes a set of mid-curvature forming blocks 34 for imparting curvature to a portion of stator bar stock 20 at an angle that is height-wise or orthogonally oriented with respect to bends imparted by bend-forming tools 32 and 33. A pre-bend or post bend stator bar clamping mechanism 39 may also be used.

One of ordinary skill in this art will recognize that a conventional commercially available relational 3-D modeling software program may be used (or an appropriate software application may be readily developed based upon well known 3-D modeling techniques) to enable 3-D modeling of a particular desired stator bar in relation to the quick-form tooling system support structures and appropriate modular bend-forming components to develop an appropriate tooling form layout that will impart the appropriate bends/curvatures to a stock stator bar during the forming operation. For example, relational 3-D modeling of the quick-form tooling system support structures and tooling component modules used in conjunction with dimensional data developed via 3-D modeling of a desired stator bar may be used to develop the custom shapes of the bar guide/curvature-forming portions of each tooling module as well as to provide a set-up reference plan that indicates the appropriate type and relative location/placement of each of the tooling modules on the surface of the support structures.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stator bar form tooling system, comprising:
a central tooling support structure having at least one clamping mechanism mounted thereon for immobilizing a center-section of a stator bar stock;
a pair of end-arm support structures for supporting one or more tooling modules for working on opposite end portions of the stator bar stock, each end-arm support structure positioned in a region on opposite sides of the central support structure and each including an upper support surface having a grid array of tool location alignment holes; and
a stator bar tooling module having one or more tool location alignment pins protruding from a bottom mounting surface that mate with corresponding tool location alignment holes on the upper surface of said end-arm support structures, wherein said tooling module is adjustably positioned on said support surface of an end-arm support structure such that an arrangement of one or more of said tooling modules mounted on said one or more end-arm support structures results in producing a particular stator bar shape during a bending and/or forming operation.

2. The stator bar form tooling system of claim 1, wherein said central tooling support structure comprises a table having three or more support legs.

3. The stator bar tooling form system of claim 1, wherein an end-arm support structure comprises a table having three or more support legs.

4. The stator bar tooling form system of claim 1, wherein said stator bar tooling module further includes a removable curvature-forming stator bar guide portion for guiding and shaping a particular section of a stator bar stock during the bending process.

5. The stator bar tooling form system of claim 1, wherein said stator bar guide portion is custom designed and manufactured for each particular stator bar forming operation.

6. The stator bar tooling form system of claim 1, wherein each end-arm support structure includes a pair of bend-forming tools separated by one or more mid-curvature forming tools for imparting a height-wise curvature to a middle portion of said stator bar stock between two bend locations.

* * * * *